United States Patent
Park et al.

(10) Patent No.: US 7,889,700 B2
(45) Date of Patent: *Feb. 15, 2011

(54) METHOD OF CONFIGURING AND UPDATING CONNECTION IDENTIFIER IN A BROADBAND WIRELESS ACCESS COMMUNICATION SYSTEM

(75) Inventors: Jung-Shin Park, Seoul (KR); Geun-Hwi Lim, Seongnam-si (KR); Hong-Sung Chang, Suwon-si (KR); Yong Chang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 367 days.

This patent is subject to a terminal disclaimer.

(21) Appl. No.: 12/099,313

(22) Filed: Apr. 8, 2008

(65) Prior Publication Data

US 2008/0186889 A1    Aug. 7, 2008

Related U.S. Application Data

(63) Continuation of application No. 11/159,534, filed on Jun. 23, 2005, now Pat. No. 7,428,227.

(30) Foreign Application Priority Data

Jun. 23, 2004    (KR) .............................. 2004-47321

(51) Int. Cl.
*H04W 4/00*    (2009.01)
(52) U.S. Cl. ....................... 370/331; 370/328
(58) Field of Classification Search ................. 370/328, 370/331; 455/414.1, 418, 436, 437
See application file for complete search history.

(56) References Cited

U.S. PATENT DOCUMENTS

| | | | |
|---|---|---|---|
| 5,787,077 A | 7/1998 | Kuehnel et al. | |
| 6,693,886 B1 | 2/2004 | Haikonen et al. | |
| 7,039,430 B2 | 5/2006 | Kang et al. | |
| 2004/0185852 A1 | 9/2004 | Son et al. | |
| 2005/0064854 A1 | 3/2005 | Jang | |
| 2005/0197123 A1 | 9/2005 | Chang et al. | |
| 2005/0265360 A1 | 12/2005 | Kim et al. | |
| 2005/0286407 A1 | 12/2005 | Park et al. | |
| 2005/0288027 A1 | 12/2005 | Cho et al. | |
| 2006/0035639 A1 | 2/2006 | Eternad et al. | |

FOREIGN PATENT DOCUMENTS

| | | |
|---|---|---|
| EP | 1 530 384 | 5/2005 |
| EP | 1 571 865 | 9/2005 |
| JP | 2005-253062 | 9/2005 |
| KR | 102003003357 | 5/2003 |
| RU | 2 178 624 | 1/1997 |

(Continued)

OTHER PUBLICATIONS

S802.16e-03/20. Leiba. Mar. 2033.*

(Continued)

*Primary Examiner*—Lester Kincaid
*Assistant Examiner*—Nathan Mitchell
(74) *Attorney, Agent, or Firm*—The Farrell Law Firm, P.C.

(57) ABSTRACT

In a method of configuring connection identifier (CID) update information in a broadband wireless access (BWA) communication system where each service between an mobile station (MS) and a base station (BS) has a unique CID, a registration request message is received from the MS, requesting updating of at least one old CID used for the MS. The CID update information is configured to include a bitmap area indicating whether a service corresponding to the at least one old CID is available, and a new CID area including at least one new CID in correspondence with a predetermined bit value in the bitmap area.

30 Claims, 4 Drawing Sheets

FOREIGN PATENT DOCUMENTS

RU           2 201 040      12/1997
WO      WO 02/51098     6/2002

OTHER PUBLICATIONS

"Broadband Radio Access Networks (BRAN); Hiperman; Data Link Control (DLC) Layer", ETSI TS 102 178, Nov. 2003.

Kevin Baum et al., Transparent Uplink Relaying for OFDMA, IEEE 802.16 Broadband Wireless Access Working Group, XP-002419889, Nov. 4, 2004.

Yong Chang et al., "Enhanced CID Update in Registration", IEEE 802.16 Broadband Wireless Access Working Group, Jun. 26, 2004.

\* cited by examiner

METHOD OF CONFIGURING AND UPDATING CONNECTION IDENTIFIER IN A BROADBAND WIRELESS ACCESS COMMUNICATION SYSTEM

PRIORITY

This application is a continuation of application Ser. No. 11/159,534, filed Jun. 23, 2005, now U.S. Pat. No. 7,428,227 which claims priority under 35 U.S.C. §119 to an application entitled "Method of Configuring and Updating Connection Identifier in a Broadband Wireless Access Communication System" filed in the Korean Intellectual Property Office on Jun. 23, 2004 and assigned Serial No. 2004-47321, the contents of which are incorporated herein by reference.

BACKGROUND OF THE INVENTION

1. Field of the Invention

The present invention relates generally to a method of configuring and updating connection identifier (CID) information in a broadband wireless access (BWA) communication system, and in particular, to a method of configuring and updating a CID on a service-flow-by-service-flow basis between a base station (BS) and a mobile station (MS).

2. Description of the Related Art

Today's development of communication technology has been increasing user demands for higher-speed transmission/reception of larger volumes of data. In this context, the Institute of Electrical and Electronics Engineers (IEEE) 802.16 standardization group is performing studies to provide BWA services to MSs.

The IEEE 802.16 standard specifies high-speed data transmission/reception schemes for MSs.

An MS transmits and receives data by connecting at least one service to a BS. A plurality of service connections are identified by their specific CIDs.

During setup of a new service connection between the MS and the BS, the BS allocates a CID that identifies the service connection to the MS. Service CIDs must have unique values so that they can be accurately distinguished within one cell under the BS. Hence, the use of a CID is confined to one cell, and the CID can be used in setting up another service connection in another cell.

In the case where the MS moves from an old cell to a new cell, or when the MS updates all existing service connections with a serving BS and re-registers with the serving BS in the BWA communication system, the new BS or the serving BS allocates a new CID for each service connection to the MS. During a handover to the new BS or reconnection to the serving BS, the MS receives the new CID from the new BS or the serving BS by a medium access control (MAC)-layer management message.

In the conventional process a new CID is allocated to the MS; that is, a CID is updated for the MS in the following way. The BS transmits to the MS CID update information including existing CIDs and new CIDs in ordered pairs. The transmission of the existing CIDs is unnecessary and causes a waste of radio resources. If the MS uses a large number of CIDs, the volume of CID update information is large. Moreover, if a large amount of CID update information is issued for a plurality of MSs, the overall BWA communication system suffers from a significant decrease in the efficiency of radio resources at connection updates.

SUMMARY OF THE INVENTION

An object of the present invention is to substantially solve at least the above problems and/or disadvantages and to provide at least the advantages described below. Accordingly, an object of the present invention is to provide a method of configuring smaller-size CID update information in a BWA communication system.

The above objects are achieved by providing a method of configuring and updating CIDs in a BWA communication system.

According to one aspect of the present invention, in a method of updating CID information in a BS of a BWA communication system, the BS arranges at least one first CID already allocated to an MS in a predetermined order, determines whether a second CID is allocated to substitute for the at least one first CID, maps the at least one first CID to a bit value in a bitmap according to the determination and including the bitmap in CID update information, and completes the CID update information by including the second CID in correspondence with the bit value in the bitmap.

According to another aspect of the present invention, in a CID update information configuration for updating service connections between a BS and an MS in a BWA communication system where CIDs are set on a service-flow-by-service-flow basis, first CID information includes field information in which the position of at least one first CID allocated to the MS before connection updating is mapped in a bitmap, and second CID information includes at least one second CID newly allocated to the MS based on the bitmap.

According to a further aspect of the present invention, in a method of configuring CID update information in a BWA communication system where each service between an MS and a BS has a unique CID, a registration request message is received from the MS, requesting updating of at least one old CID used for the MS. The CID update information is configured to include a bitmap area indicating whether a service corresponding to the at least one old CID is available, and a new CID area including at least one new CID in correspondence with a predetermined bit value in the bitmap area.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, a typical CID updating method and the configuration of typical CID update information will precede an embodiment of the present invention. As to terms used herein, "first CID" refers to a CID that identifies a service connected between an MS and an old BS, and "second CID" refers to a CID that a new BS allocates to the MS. In the case where the MS is to update an existing CID associated with the old BS, the old BS may allocate a second CID to the MS, or as the MS hands over to a new BS, the new BS may allocate the second CID to the MS. An example is provided for the latter case.

Figure 1:
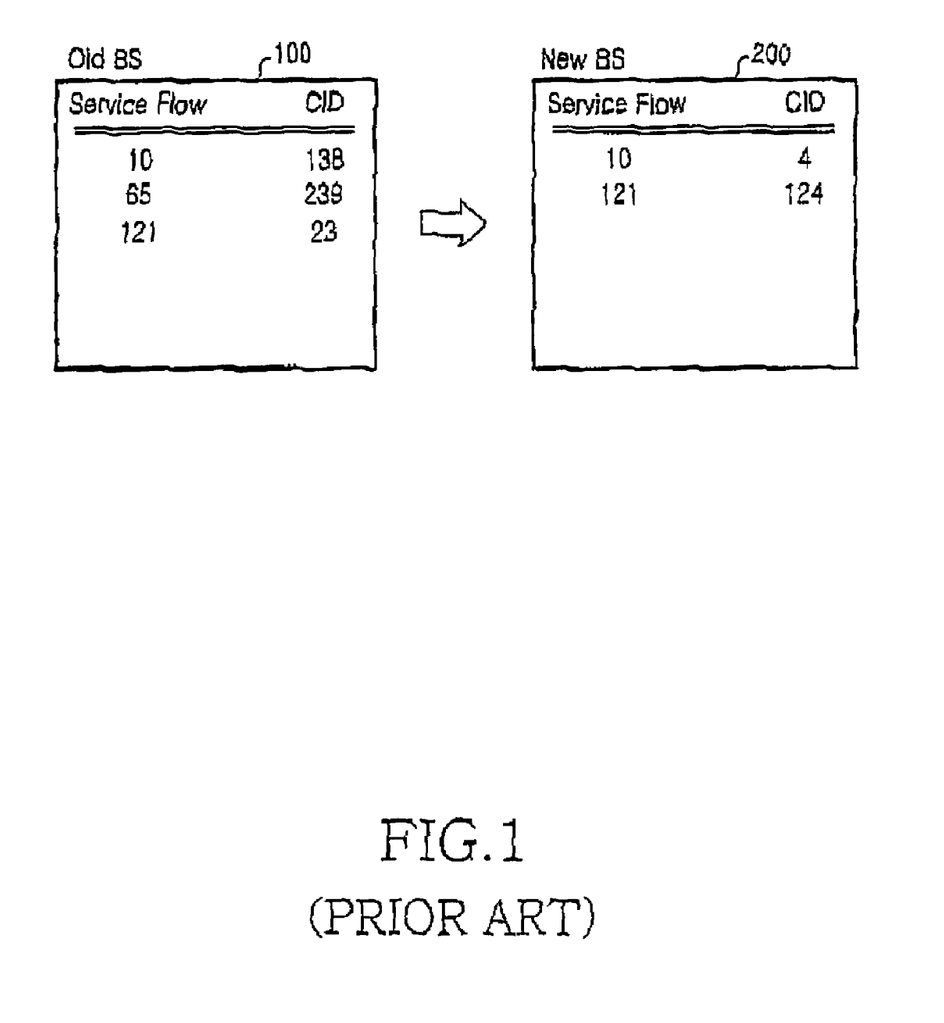
FIG. 1 illustrates an example of the mapping relationship between services and CIDs in a BWA communication system.

FIG. 1 illustrates an example of the mapping relationship between services and CIDs in a BWA communication system.

Referring to FIG. 1, an MS receives CID information from a BS to thereby identify packets, service-flow-by-service-flow. The MS receives three services 10, 65 and 121 identified by CIDs 138, 239 and 23, respectively from an old BS 100.

As the MS moves from the old BS 100 to a new BS 200, the CIDs 138 and 23 are changed to 4 and 124, respectively, in a CID updating operation of the new BS 200. In the example illustrated in FIG. 1, the service with the CID 239 is not serviced in the new BS 200, that is, the service connection is terminated. Thus, the CID 239 is released. The MS, which has handed over to the new BS 200, is now receiving the services 10 and 121 with the updated CIDs 4 and 124, respectively from the new BS 200.

Figure 2:
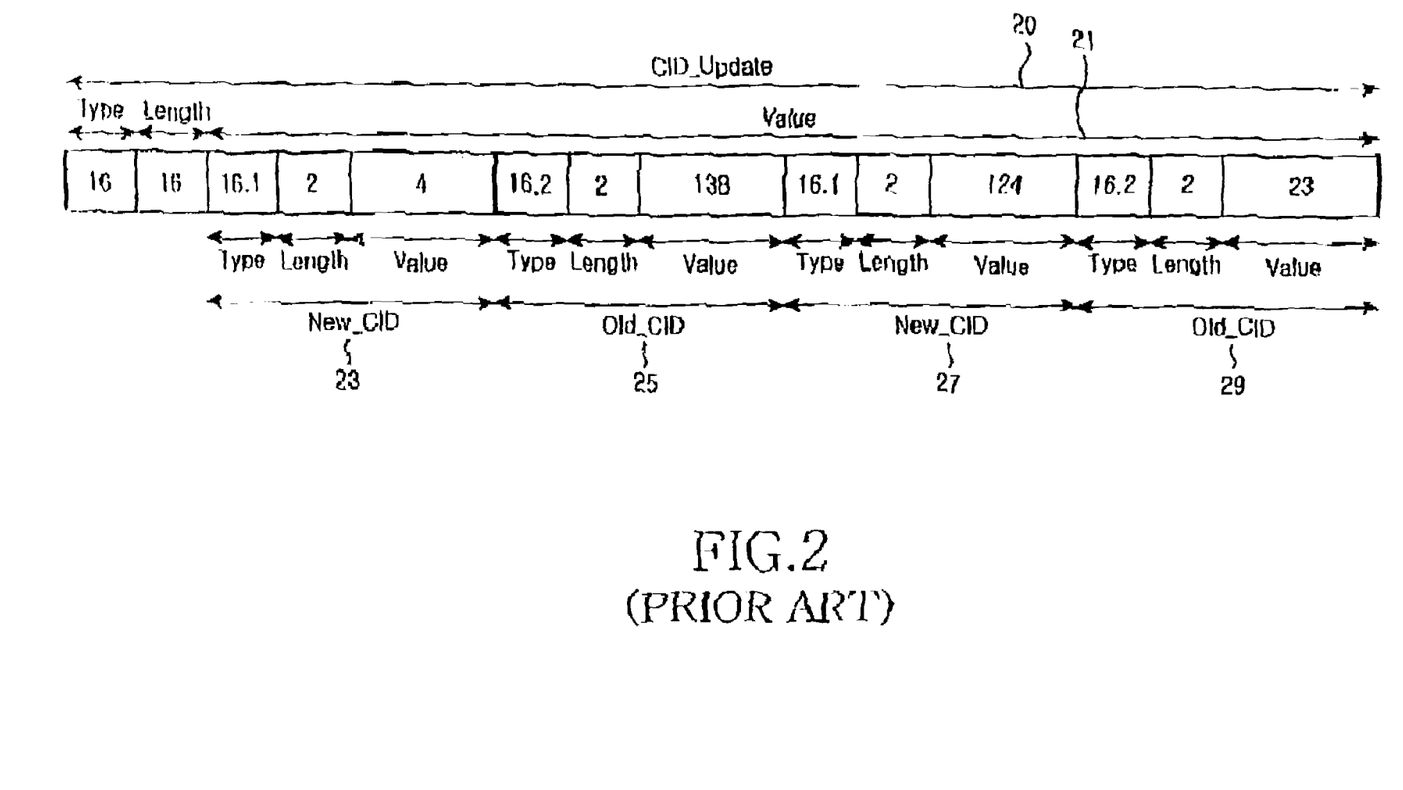
FIG. 2 illustrates a typical data format of CID update information provided to an MS in the BWA communication system.

FIG. 2 illustrates a typical format of CID update information provided to an MS in the BWA communication system.

Now, referring to FIGS. 1 and 2, CID update information 20 (CID_Update) has type-length-value (TLV) encoding fields. A Value field 21 is configured to have first CIDs (Old_CID) and second CIDs (New_CID) in the form of TLVs.

Table 1 below illustrates the TLV encoding format of CID_Update and Table 2 below illustrates the TLV encoding format of the first and second CIDs.

TABLE 1

| Name | Type (1 byte) | Length (1 byte) | Value (Variable) |
|---|---|---|---|
| CID_Update | 16 | Variable | Compound |

TABLE 2

| Name | Type (1 byte) | Length (1 byte) | Value (Variable) |
|---|---|---|---|
| New_CID | 16.1 | 2 | CID after handover |
| Old_CID | 16.2 | 2 | CID before handover |

The values of Types in Table 1 and Table 2 are set in compliance with the IEEE 802.16 standards. Each of first and second CIDs is represented by 1-byte Type, 1-byte Length, and 2-byte CID information, having a total of 4-bytes of information.

First and second CIDs encoded in the manner illustrated in Table 1 and Table 2 are set in the Value field 21 such that a first CID 25 & a second CID 23 and a first CID 29 & a second CID 27 are arranged in pairs for corresponding services. In the case of typical CID_Update illustrated in FIG. 2, for example, when two CIDs are updated, the Value field 21 has a total of 16-bytes of information. Therefore, the transmission of the first CIDs along with the second CIDs causes a waste of radio resources.

Accordingly, the present invention provides a method of modifying the configuration of the CID update information to minimize the amount of first CID information included in the CID update information. More specifically, the new BS 200 compresses the entire first CIDs allocated by the old BS 100 in the form of a bitmap. To do so, the new BS 200 arranges the first CIDs in a predetermined order (i.e. ascending or descending order) of CID value and indicates in the bitmap whether the first CIDs have been updated or not. The arrangement order can be the order of allocating the first CIDs by the old BS 100, the order of recognizing the first CIDs by the new BS 200, or a predetermined order.

In updating the first CIDs allocated by the old BS 100, the new BS 200 sets bit values at positions corresponding to the arranged first CIDs to 1s if the new BS 200 can allocate second CIDs to substitute for the first CIDs. However, if a service provided by the old BS 100 is not available to the MS in the new BS 200 (for example, the service with a first CID of 239 in FIG. 1) the new BS 200 sets a bit value at a position corresponding to the position of the first CID to 0, to thereby indicate whether the services with the CIDs used with the old BS 100 are successfully updated in the new BS 200.

By configuring a first CID field in the new CID update information in this way, the first CIDs are represented in a bitmap. New CIDs substituting for old CIDs having a bit value of 1 from the least significant bit (LSB) to the most significant bit (MSB) of the bitmap are arranged successively in the TLV encoding format, following the bitmap. In this manner, the new CID update information is completely configured, which will be described in greater detail in reference to FIG. 3.

Figure 3:
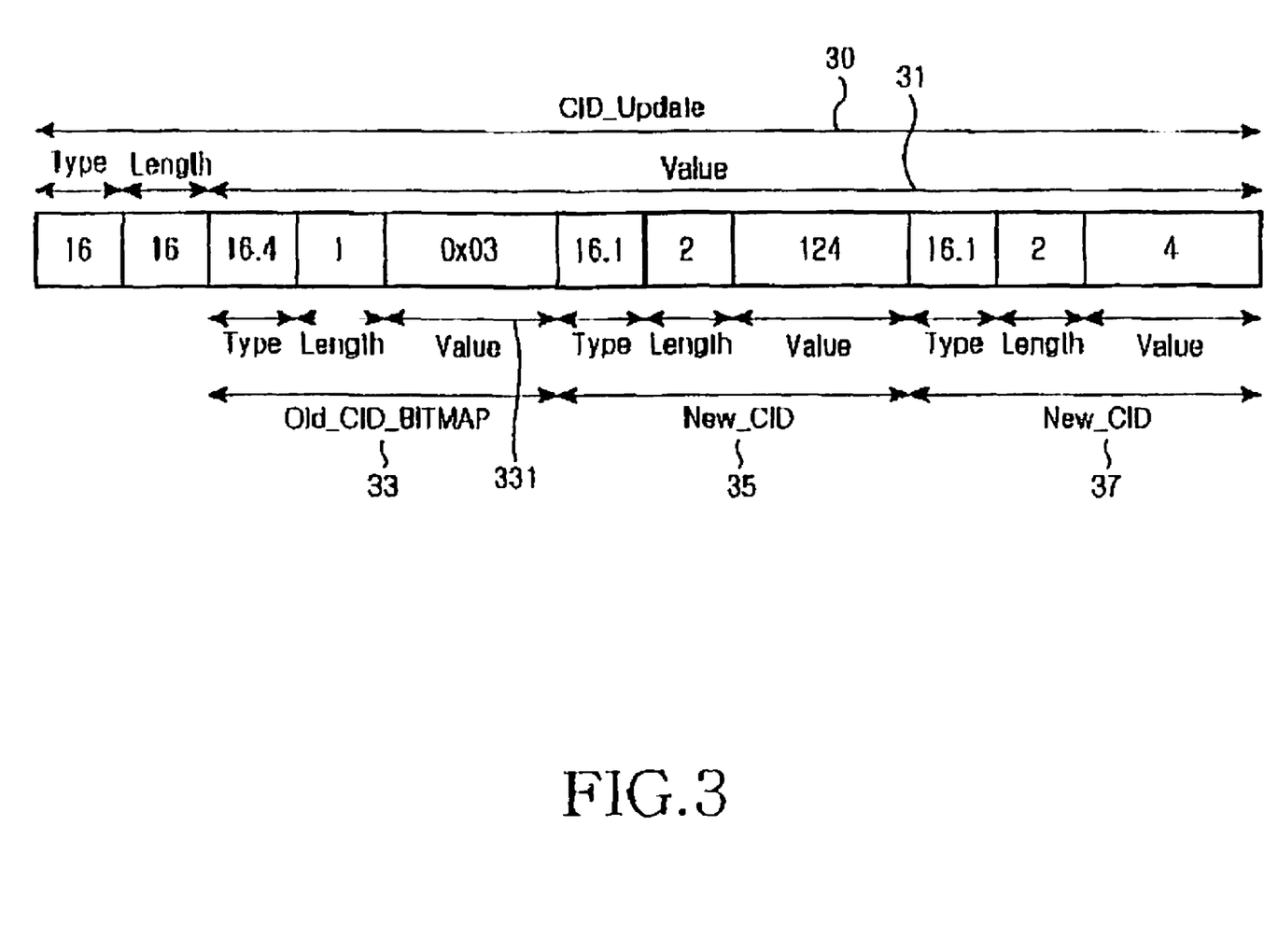
FIG. 3 illustrates the data format of CID update information provided to an MS in a BWA communication system according to the present invention.

FIG. 3 illustrates the data format of the CID update information provided to an MS in a BWA communication system according to the present invention.

Referring to FIGS. 1 and 3, new CID update information 30 (CID_Update) of the present invention is composed of a plurality of TLV fields. These TLV fields are divided into an Old_CID_BITMAP area 33 representing services which have CIDs allocated by the old BS and are also available in the new BS, as a bitmap code of first CIDs, and New_CID areas 35 and 37 sequentially representing new CIDs corresponding to bit value 1 in the Old_CID_BITMAP area 33.

Table 3 below illustrates an example of encoding the CID update information 30, and Table 4 below illustrates an example of encoding the Old_CID_BITMAP 33, New_CID 35, and New_CID 37.

TABLE 3

| Name | Type (1 byte) | Length (1 byte) | Value (Variable) |
|---|---|---|---|
| CID_Update | 16 | Variable | Compound |

TABLE 4

| Name | Type (1 byte) | Length (1 byte) | Value (Variable) |
| --- | --- | --- | --- |
| New_CID | 16.1 | 2 | CID after handover |
| Old_CID_BITMAP | 16.4 | Variable | The first one byte indicates the length of the following BITMAP in bytes. The n-th MSB of the BITMAP set to 1 when the n-th old CID is successfully updated to new one. Where, the old CIDs are sorted with increasing order. After the BITMAP, a list of new CID follows. The number of new CID is equal to the number of '1' in the BITMAP. |

The values of Types except for Old_CID_BITMAP in Table 3 and Table 4 are set in compliance with the IEEE 802.16 standards. Each of second CIDs 35 and 37 is represented by 1-byte Type, 1-byte Length, and 2-byte CID information, having a total of 4-bytes of information. Compared to the conventional CID update information, the Old_CID_BITMAP 33 includes a bitmap field 331 indicating whether second CIDs are allocated or not for their corresponding first CIDs, thereby reducing the size of the first CID information.

Now a description will be made of an example of configuring the new CID update information according to the present invention with reference to FIG. 1.

The old BS 100 manages the CIDs 138, 239 and 23 corresponding to the three respective services 10, 65 and 121. As the MS moves from the old BS 100 to the new BS 200, it registers to the new BS 200. During a CID update operation in the registration, the new BS 200 need not to allocate a new CID for the service 65 because the new BS 200 cannot provide the service 65 with the first CID 239 or the MS does not need to receive the service 65.

The new BS 200 then configures the Old_CID_BITMAP area illustrated in FIG. 3 in order to configure the new CID update information. The new BS 200 arranges the first CIDs 138, 239 and 23 in a predetermined order (i.e. ascending or descending order) of CID value and sets bit values for the arranged first CIDs to allocation or non-allocation in a binary bitmap. Specifically, the new BS 200 arranges the first CIDs 239, 138 and 23 in this order, maps the arranged first CIDs to bits starting from the LSB in one to one correspondence, and sets bits for the first CIDs of the services 138 and 23 each to 1 and a bit for the first CID of the service 239 to 0. As a result, the bitmap value is "011". In "011", "0" corresponds to "239", "1" to "138" and the last "1" to "23".

The new BS 200 must allocate new CIDs for the second and last "1" bits. In FIG. 1, the new CIDs are "4" and "124". Thus, "124" corresponding to the last "1" is mapped in the Value field of the New_CID 35, and "4" corresponding to the second "1" is mapped in the Value field of the New_CID 37. While the new CIDs are mapped sequentially in the order starting from the LSB, it is obvious that the new CID mapping can be carried out in the order starting from the MSB.

Figure 4:
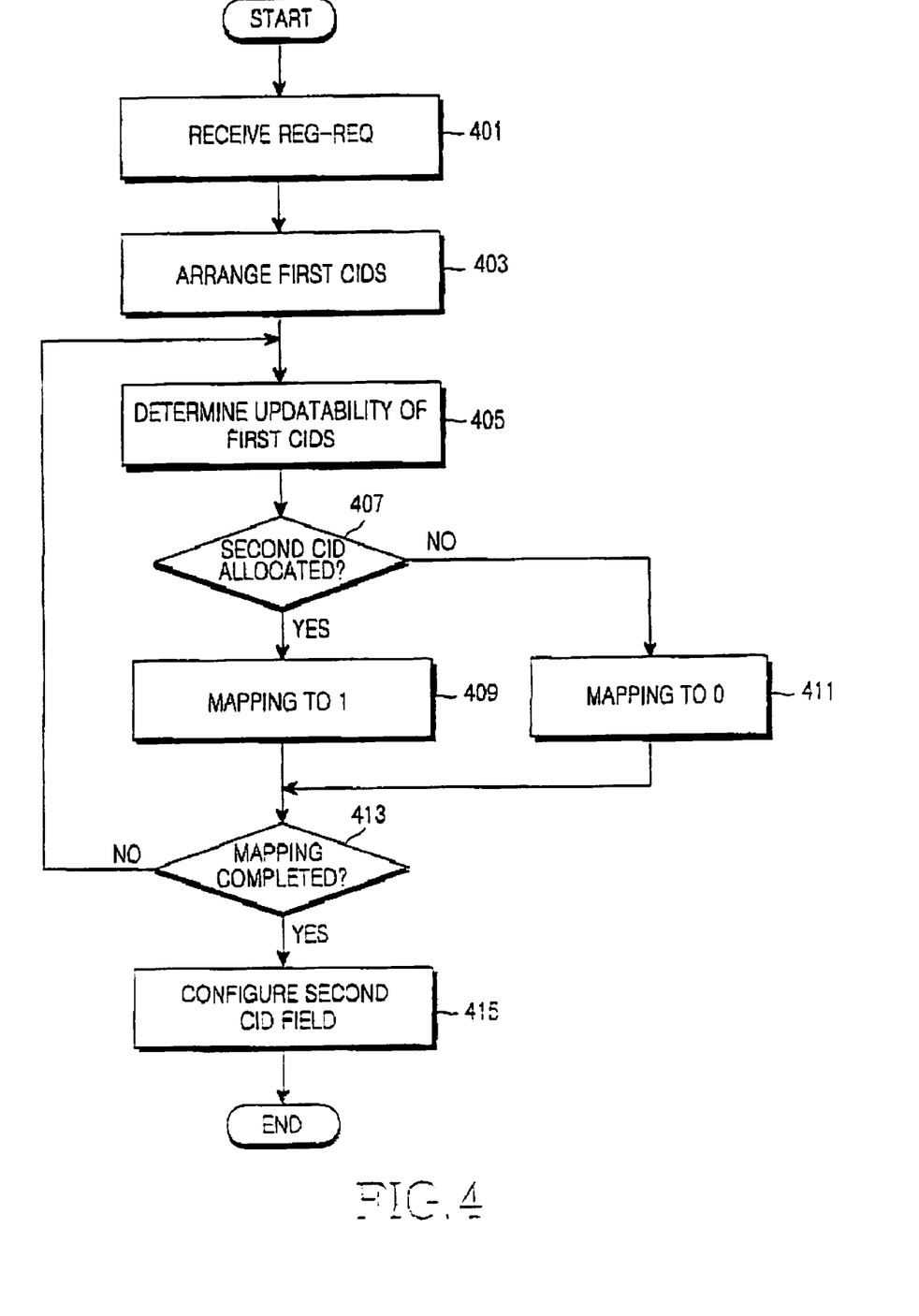
FIG. 4 is a flowchart illustrating a CID updating method between a BS and an MS in the BWA communication system according to the present invention.

FIG. 4 is a flowchart illustrating a CID updating method between a BS and an MS in the BWA communication system according to the present invention.

Referring to FIG. 4, upon receipt of a registration-request (REG-REQ) message in step 401, the new BS arranges first CIDs allocated to the MS by the old BS in a predetermined order (for example, according to the CID values) in step 403. The new BS determines whether an arranged first CID can be updated in step 405 and determines whether a second CID has been allocated with respect to the first CID in step 407. If a second CID is allocated, the procedure goes to step 409, otherwise it goes to step 411. The second CID is a value that the new BS sets randomly. That is, the new BS creates connections for available services considering its resource state, determines new CIDs for the available service, and notifies the MS of the new CIDs in a CID updating procedure.

In step 409, a bit value corresponding to the first CID is set to 1 in the Value field of the Old_CID_BITMAP area. In step 411, the bit value corresponding to the first CIDs is set to 0 in the Value field of the Old_CID_BITMAP area. The new BS maps bit values sequentially starting from the LSB in the Old_CID_BITMAP area in step 413. Steps 405 through 411 are repeated until the first CID mapping is completed.

In step 415, the new BS encodes second CIDs corresponding to 1s in the Old_CID_BITMAP in the TLV format, thereby generating CID update information. The CID update information is transmitted to the MS by a registration-response (REG-RSP) message for the REG-REQ message.

For accurate mapping between first CIDs and second CIDs, the first CIDs are arranged according to a criterion preset between the MS and the BS, such as CID value.

In accordance with the present invention as described above, a new BS encodes at least one CID allocated to an MS by an old BS to be compressed to a bitmap and creates new CIDs according to the bit values of the bitmap. Therefore, the amount of CID update information that the MS receives at a handover is reduced and, as a result, the use efficiency of radio resources is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting identifier (ID) update information by a base station (BS) in a broadband wireless access (BWA) communication system, comprising the steps of:

receiving a registration request (REG-REQ) message from a mobile station (MS); and transmitting a registration response (REG-RSP) message to the MS, wherein the REG-RSP message includes ID update information including a bitmap area and a new ID area, the bitmap area indicates whether at least one ID corresponding to at least one service is updated, and the new ID area includes at least one new ID in correspondence with a predetermined bit value in the bitmap area.

2. The method of claim 1, further comprising the step of:
configuring the REG-RSP message after reception of the REG-REQ message.

3. The method of claim 2, wherein the configuring step further comprises the steps of:
arranging the at least one ID corresponding to the at least one service in a predetermined order;
determining whether the at least one new ID is allocated to update the at least one ID corresponding to the at least one service;
setting the at least one bit value in the bitmap area according to the determination; and
configuring the REG-RSP message by including the bitmap area and the new ID information area when at least one bit value in the bitmap area indicates that the at least one new ID is allocated to update the at least one ID corresponding to the least one service.

4. The method of claim 3, wherein the predetermined order is one of an ascending order of value of the at least one ID corresponding to the at least one service and descending order of the value of the at least one ID corresponding to the at least one service.

5. The method of claim 3, wherein the setting step further comprises the step of setting the at least one bit value sequentially starting from the least significant bit (LSB) of the bitmap area according to whether the at least one new ID is allocated.

6. The method of claim 3, wherein the setting step further comprises the step of setting the at least one bit value sequentially starting from the most significant bit (MSB) of the bitmap area according to whether the at least one new ID is allocated.

7. The method of claim 3, wherein the setting step further comprises the steps of:
setting the at least one bit value to 1 at a predetermined bit position in the bitmap area, when the at least one new ID is allocated; and
setting the at least one bit value to 0 at the predetermined bit position in the bitmap area, when the at least one new ID is not allocated.

8. The method of claim 1, wherein the ID corresponding to the service is a service flow ID and the new ID is a connection ID (CID).

9. The method of claim 1, wherein at least one bit among bits included in the bitmap area indicates a length of the bitmap area.

10. The method of claim 1, wherein the number of the at least one new ID is equal to the number of bit value indicating that the new ID is allocated to update the at least one ID corresponding to the at least one service among bit value in the bitmap area.

11. A method for receiving identifier (ID) update information by a mobile station (MS) in a broadband wireless access (BWA) communication system, comprising the steps of:
transmitting a registration request (REG-REQ) message to a base station (BS); and
receiving a registration response (REG-RSP) message from the BS,
wherein the REG-RSP message includes ID update information including a bitmap area and a new ID area, the bitmap area indicates whether at least one ID corresponding to at least one service is updated, and the new ID area includes at least one new ID in correspondence with a predetermined bit value in the bitmap area.

12. The method of claim 11, wherein the at least one bit value is set to 1 at a predetermined bit position in the bitmap area, when the at least one new ID is allocated, and the at least one bit value is set to 0 at the predetermined bit position in the bitmap area, when the at least one new ID is not allocated.

13. The method of claim 11, wherein the ID corresponding to the-service is a service flow ID and the new ID is a connection ID (CID).

14. The method of claim 11, wherein at least one bit among bits included in the bitmap area indicates a length of the bitmap area.

15. The method of claim 11, wherein the number of the at least one new ID is equal to the number of the predetermined bit value indicating that the new ID is allocated to update the at least one ID corresponding to the at least one service among bit values in the bitmap area.

16. A system to transmit identifier (ID) update information in a broadband wireless access (BWA) communication system, comprising:
a mobile station (MS); and
a base station (BS) to receive a registration request (REG-REQ) message from the MS, and transmit a registration response (REG-RSP) message to the MS,
wherein the REG-RSP message includes ID update information including a bitmap area and a new ID area, the bitmap area indicates whether at least one ID corresponding to at least one service is updated, and the new ID area includes at least one new ID in correspondence with a predetermined bit value in the bitmap area.

17. The system of claim 16, wherein the BS configures the REG-RSP message after reception of the REG-REQ message.

18. The system of claim 17, wherein the BS arranges the at least one ID corresponding to the at least one service in a predetermined order, determines whether the at least one new ID is allocated to update the at least one ID corresponding to the at least one service, sets the at least one bit value in the bitmap area according to the determination, and configures the REG-RSP message by including the bitmap area and the new ID information when at least one bit value in the bitmap area indicates that the at least one new ID is allocated to update the at least one ID corresponding to the at least one service.

19. The system of claim 18, wherein the predetermined order is one of an ascending order of value of the at least one ID corresponding to the at least one service and descending order of the value of the at least one ID corresponding to the at least one service.

20. The system of claim 18, wherein the BS sets the at least one bit value sequentially starting from the least significant bit (LSB) of the bitmap area according to whether or not the at least one new ID is allocated.

21. The system of claim 18, wherein the BS sets the at least one bit value sequentially starting from the most significant bit (MSB) of the bitmap area according to whether or not the at least one new ID is allocated.

22. The system of claim 18, wherein the BS sets the at least one bit value to 1 at a predetermined bit position in the bitmap area, when the at least one new ID is allocated, and sets the at least one bit value to 0 at the predetermined bit position in the bitmap area, when the at least one new ID is not allocated.

23. The system of claim 16, wherein the ID corresponding to the-service is a service flow ID and the new ID is a connection ID (CID).

24. The system of claim 16, wherein at least one bit among bits included in the bitmap area indicates a length of the bitmap area.

25. The system of claim 16, wherein the number of the at least one new ID is equal to the number of the predetermined bit value indicating that the new ID is allocated to update the at least one ID corresponding to the at least one service among bit values in the bitmap area.

26. A system for receiving identifier (ID) update information in a broadband wireless access (BWA) communication system, comprising:
   a base station (BS); and
   a mobile station (MS) for transmitting a registration request (REG-REQ) message to a base station (BS), and receiving a registration response (REG-RSP) message from the BS,
   wherein the REG-RSP message includes ID update information including a bitmap area and a new ID area, the bitmap area indicates whether at least one ID corresponding to at least one service is updated, and the new ID area includes at least one new ID in correspondence with a predetermined bit value in the bitmap area.

27. The system of claim 26, wherein the at least one bit value is set to 1 at a predetermined bit position in the bitmap area, when the at least one new ID is allocated, and the at least one bit value is set to 0 at the predetermined bit position in the bitmap area, when the at least one new ID is not allocated.

28. The system of claim 26, wherein the ID corresponding to the service is a service flow ID and the new ID is a connection ID (CID).

29. The system of claim 26, wherein at least one bit among bits included in the bitmap area indicates a length of the bitmap area.

30. The system of claim 26, wherein the number of the at least one new ID is equal to the number of the predetermined bit value indicating that the new ID is allocated to update the at least one ID corresponding to the at least one service among bit values in the bitmap area.

* * * * *